US006604277B2

(12) United States Patent
Schultz et al.

(10) Patent No.: US 6,604,277 B2
(45) Date of Patent: Aug. 12, 2003

(54) METHOD FOR LOCKING CONTACTS IN AUTOMATIC TRANSFER SWITCH

(75) Inventors: Ronald L. Schultz, Northfield, IL (US); Dariusz Fudala, Bridgeview, IL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/681,554

(22) Filed: Apr. 27, 2001

(65) Prior Publication Data

US 2002/0157929 A1 Oct. 31, 2002

(51) Int. Cl.[7] ............................ H01H 11/00; H02J 7/00
(52) U.S. Cl. ............................ 29/622; 307/64; 200/17
(58) Field of Search ............................ 29/622; 307/64, 307/65, 66, 67, 68; 200/17, 18

(56) References Cited

U.S. PATENT DOCUMENTS 3,936,782 A * 2/1976 Moakler et al. .............. 307/64
4,021,678 A 5/1977 Moakler et al.
4,157,461 A * 6/1979 Wiktor ........................ 200/18
4,398,097 A 8/1983 Schell et al.
4,423,336 A 12/1983 Iverson et al.
4,467,905 A * 8/1984 Takeuchi .................... 192/214
4,530,673 A * 7/1985 Lamarche ................ 192/213.3
4,760,278 A * 7/1988 Thomson ..................... 307/64
5,023,469 A 6/1991 Bassett et al.
5,914,467 A 6/1999 Jonas et al.
6,168,000 B1 * 1/2001 Pusic ........................ 192/58.2

* cited by examiner

*Primary Examiner*—Carl J. Arbes
*Assistant Examiner*—Thiem D Phan
(74) *Attorney, Agent, or Firm*—Karl A. Vick, Esq.; Armstrong Teasdale LLP

(57) ABSTRACT

A method for locking contacts in an automatic transfer switch is provided. The automatic transfer switch includes a plurality of pole units including a plurality of contact pairs. The method includes mounting an interior locking device in at least one pole unit and locking at least one contact pair individually with the interior locking device housed in that contact pair's pole unit.

7 Claims, 4 Drawing Sheets

METHOD FOR LOCKING CONTACTS IN AUTOMATIC TRANSFER SWITCH

BACKGROUND OF INVENTION

This invention relates generally to electrical switches and, more particularly, to automatic transfer switches.

Many businesses use transfer switches for switching power sources, for example, from a public utility source to a private secondary supply, automatically within a matter of seconds. Critical load businesses, such as, for example, hospitals, airport radar towers, high volume data centers are dependent upon automatic transfer switches to provide continuous power. Transfer switches typically utilize a plurality of contacts that can be open or closed.

Typically, it is desired that a transfer switch remain closed during a fault or overcurrent condition. During a fault condition, a large and quick influx of electrical energy causes a blow open force between the contacts. Therefore, if not locked together, the contacts will interfere with upstream protection (i.e. circuit breakers) and upset coordination between devices. Known transfer switches incorporate a toggle locking of an external mechanism to keep the switch closed during a fault condition. However, this external locking is distant from the contacts of the switch and, accordingly, a play exists in the structure between the lock and the contacts. This play and a shaft torque allow the contacts to separate slightly during a fault condition due to the blow open force. When the contacts are separated slightly, an arcing across the contacts occurs damaging the contacts.

SUMMARY OF INVENTION

In one aspect, a method for locking contacts in an automatic transfer switch is provided. The automatic transfer switch includes a plurality of pole units including a plurality of contact pairs. The method includes mounting an interior locking device in at least one pole unit and locking at least one contact pair individually with the interior locking device housed in that contact pair's pole unit.

In another aspect, a pole unit for an automatic transfer switch is provided. The pole unit includes a housing, a load lug housed in the housing, and an interior locking device mounted in the housing to electrically couple to the load lug in a first position and in a second position. The pole unit further includes a plurality of source lugs including a first source lug and a second source lug mounted in the housing, wherein each source lug is electrically isolated from each other and the load lug, and the interior locking device is configured to electrically couple at least one of the first source lug and the second source lug to the load lug.

In another aspect, an automatic transfer switch is provided. The automatic transfer switch includes a plurality of pole units including a bore therethrough, wherein the housing units are connected with the bores aligned. The switch further includes at least one interior locking device mounted in at least one of the units, the interior locking device comprising a bore therethrough, wherein the bore of the locking device is aligned with the bores of the units. The automatic transfer switch further includes an end wall comprising a bore aligned with the bores of the units and a shaft axially mounted in the interior locking device bore and the housing unit bore. The shaft extends through the end wall and includes an extended portion, and a flywheel is mounted on the extended portion of the shaft.

In a further aspect, a pole unit for an automatic transfer switch includes a housing and at least one of a dual disk and a conjugate cam mounted in the housing. The conjugate cam has a tri-lobal shape and is within a conductor assembly. The dual disk includes a driving disk and a driven disk, wherein the driving disk includes a cammed surface configured to engage at least one locking tab.

DETAILED DESCRIPTION

Figure 1:
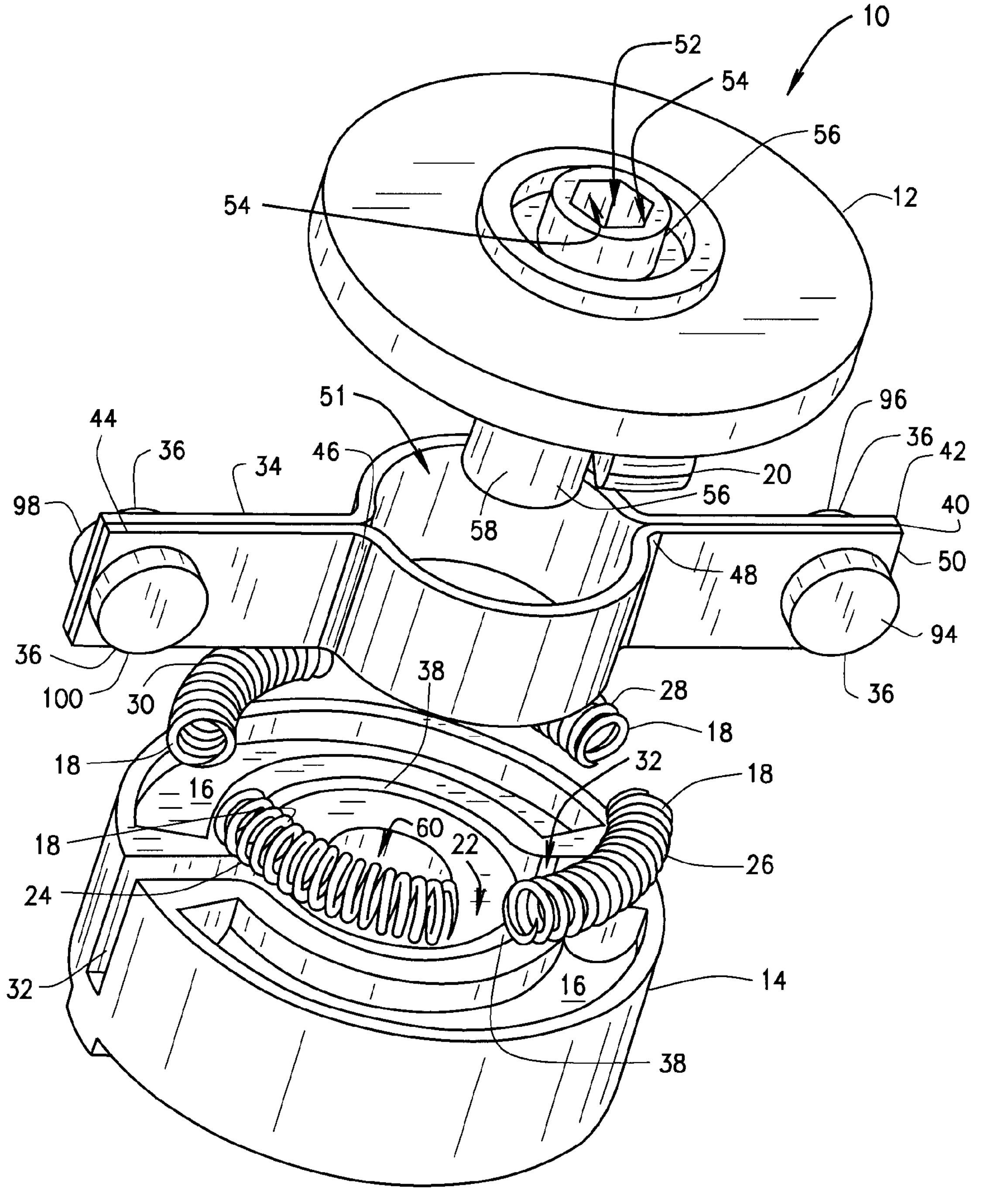
FIG. 1 is an exploded perspective view of a dual disk including a driving disk and a driven disk.

FIG. 1 is an exploded perspective view of a dual disk 10 including a driving disk 12 and a driven disk 14 including a plurality of chambers 16 sized to receive a plurality of resilient members 18. Driving disk 12 includes a first centering finger that is positioned in a first gap 22 between a first resilient member 24 and a second resilient member 26 when dual disk 10 is assembled. Driving disk 12 further includes a second centering finger (not shown) opposite first centering finger 20 that is positioned in a second gap (not shown) between a third resilient member 28 and a fourth resilient member 30.

Driven disk 14 further includes a plurality of slots 32 to receive a conductor 34 having a plurality of contacts 36 mounted thereon. Slots 32 are in flow communication via a plurality of arcuate channels 38. Conductor 34 includes a first member 40 and a second member 42 that is substantially identical to first member 40 and is attached to first member 40. First member 40 includes a first end portion 44 and extends from first end portion 44 substantially in a first plane to a first bend 46 and then extends arcuately to a second bend 48 after which first member 40 extends in the first plane to a second end portion 50.

First member 40 is attached to second member 42 such that arcuate sections of members 40 and 42 form a substantially circular opening 51. Each end portion 44 and 50 has a contact 36 mounted thereon. Driving disk 12 further includes a polygonal shaped bore to receive a shaft (not shown). The bore is defined by a plurality of inner walls 54. In an exemplary embodiment, the polygonal shaped bore is a hexagonal shaped bore. Inner walls 54 extend radially outward to a cylindrical surface 56 which extends longitudinally from a bottom surface (not shown) of driving disk 12 forming a cylinder 58. Driven disk 14 includes a substantially circular bore 60 to receive cylinder 58.

During operation of an assembled dual disk 10, a rotation of the shaft exerts a rotational force on inner walls 54 causing driving disk 12 to rotate. First and second centering fingers 20 exert a rotational force on resilient members 18 causing driven disk 14 and conductor 34 to rotate. When any particular contact 36 on conductor 34 contacts an object, conductor 34 stops rotating while driving disk 12 continues to rotate and, depending upon direction of rotation, either first and third resilient members 24 and 28 are compressed or second and fourth resilient members 26 and 30 are compressed causing a biasing of that particular contact against the object. In an exemplary embodiment, resilient members 18 are springs.

Figure 2:
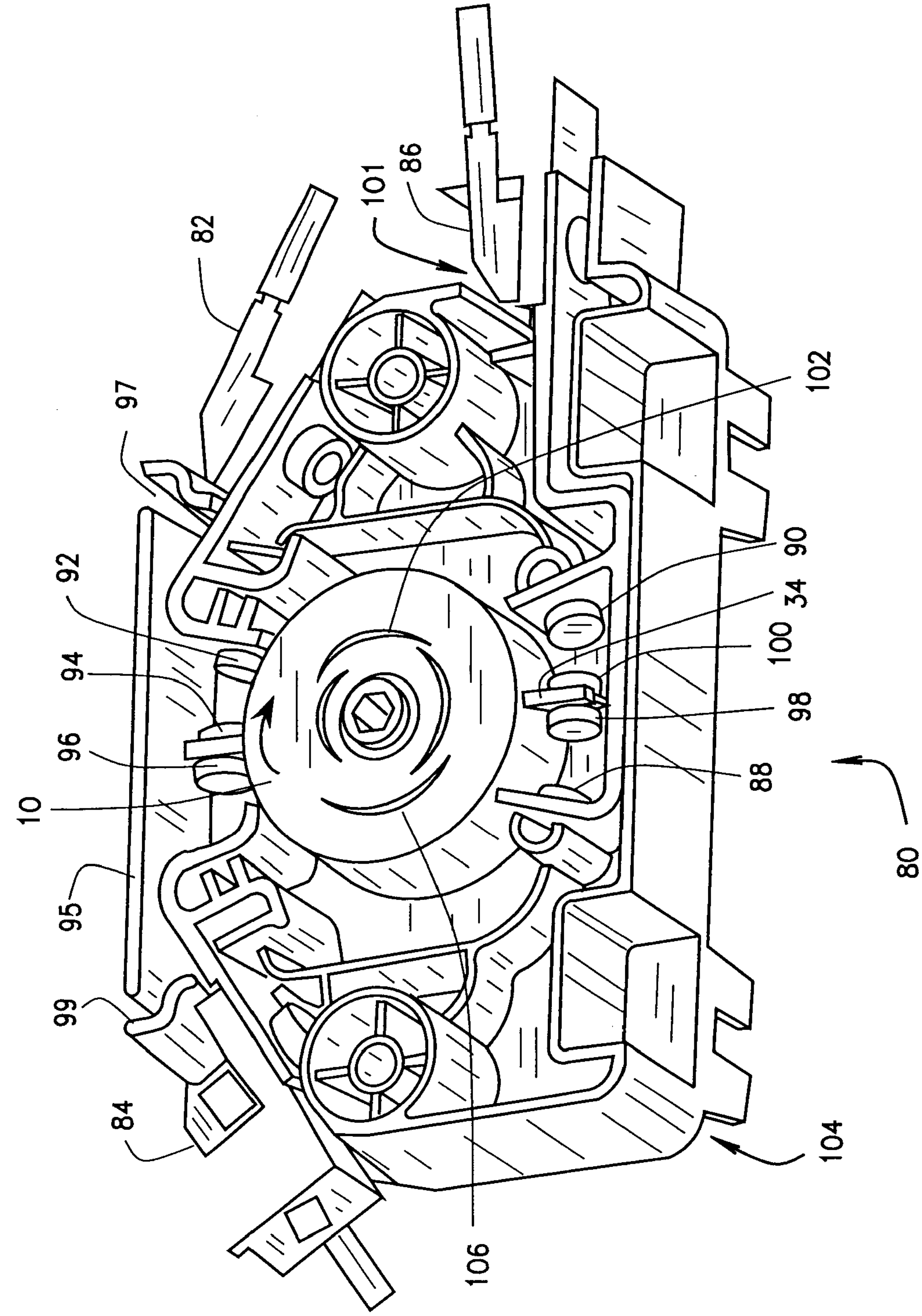
FIG. 2 is a perspective view of a pole unit with the dual disk shown in FIG. 1 positioned thereon.

FIG. 2 is a perspective view of a pole unit 80 with dual disk 10 (shown in FIG. 1) positioned therein. Pole unit 80 includes a first source lug 82, a second source lug 84, and a load lug 86 electrically connected to a first load contact 88 and a second load contact 90. Pole unit 80 further includes a first source contact 92 electrically connected to first source lug 82 and a second source contact (not shown) electrically connected to second source lug 84. Conductor 34 includes a first contact 94, a second contact 96, a third contact 98, and a fourth contact 100 mounted thereon. Pole unit 80 further includes a housing 95 including a first slot 97 substantially adjacent first source lug 82, a second slot 99 substantially adjacent second source lug 84, and a third slot 101 substantially adjacent load lug 86. Housing 95 is fabricated from non-conductive material and electrically isolates first source lug 82, second source lug 84, and load lug 86.

During operation of pole unit 80, a shaft (not shown) passes through bore 52 (shown in FIG. 1) and a bore (not shown) of pole unit 80. When the shaft is rotated to a first position (not shown in FIG. 2), dual disk 10 rotates clockwise and first contact 94 contacts first source contact 92 forming a first contact pair with a slight wiping motion which causes an abrading of the surfaces (not shown) of first contact 94 and first source contact 92. Approximately simultaneously with forming the first contact, third contact 98 contacts first load contact 88 forming a second contact pair with a slight wiping motion which causes an abrading of the surfaces (not shown) of third contact 98 and first load contact 88.

After first and second contact pairs are formed, driven disk 14 remains substantially stationary but driving disk 12 continues to rotate causing first and third resilient members 24 and 28 to compress individually locking first and second contact pairs in their contacted positions. In an alternative embodiment, dual disk 10 includes a cammed surface 102 that locks by engaging a plurality of locking tabs (not shown) extending from a back side 104 of pole unit 80 and a terminal plate (not shown in FIG. 2). Beneath cammed surface 102 is a cammed resilient member (not shown) that allows cammed surface 102 to be depressed slightly and biased back to an uncompressed position after the locking tab clears a raised cam portion 106 of cammed surface 102. In an exemplary embodiment, the cammed resilient member is a wave washer. Slots 97, 99, and 101 provide for overpressure relief during a fault condition by allowing heated gases to escape pole unit 80 without enhancing ingress of foreign material.

Figure 3:
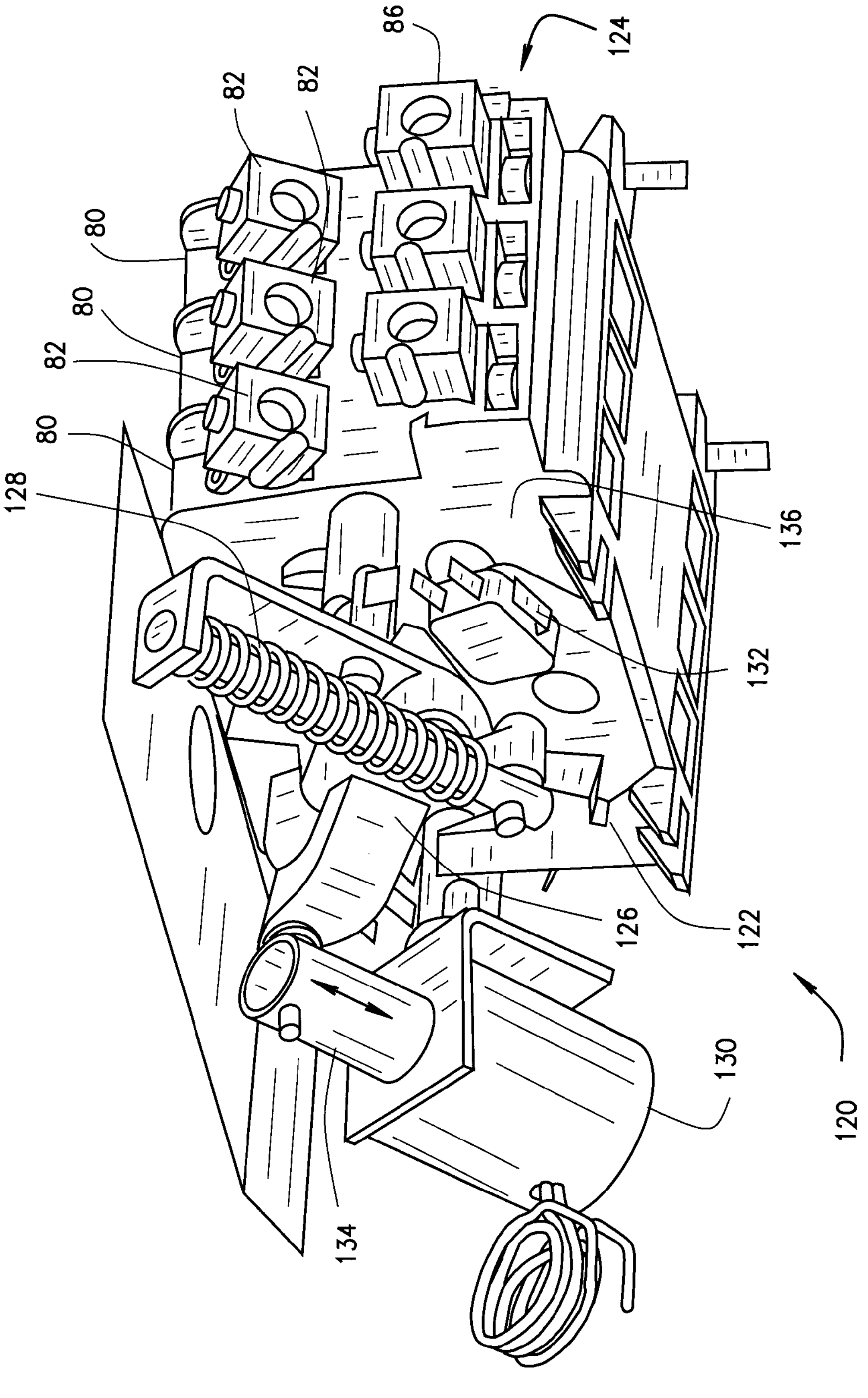
FIG. 3 is a perspective view of an automatic transfer switch including a plurality of the pole units shown in FIG. 2.

FIG. 3 is a perspective view of an automatic transfer switch 120 including a plurality of pole units 80 (shown in FIG. 2). Pole units 80 are positioned such that bores 52 of their respective dual disks 10 are aligned and a shaft (not shown) extends from a first side 122 of switch 120 through bores 52 to a second side 124 of switch 120. The shaft extends from first side 122 to a flywheel 126 that is biased in a first position by a switch resilient member 128.

In an exemplary embodiment, switch resilient member 128 is a spring. Flywheel 126 is connected to a solenoid 130 that is controlled by a controller (not shown) electrically connected to a limit switch 132. Solenoid 130 includes a plunger 134. First side 122 includes a termination plate 136 including at least one locking tab on an interior side (not shown) of termination plate. Because each pole unit 80 has a back side 104 including at least one locking tab, and termination plate 136 has a locking tab in conjunction with the stacked axial placement of each pole unit 80, each cammed surface 102 is positioned against a surface having at least one locking tab.

Accordingly, each contact pair is locked in close proximity to the contact pair by an interior locking device. Dual disc 10 is interior to pole unit 80 and locks the contact pairs together and, accordingly, dual disc 10 is an interior locking device. Since an interior locking device locks the contact pairs, as parts wear out and play develops, the contact pairs maintain rigid contact together.

In operation, transfer switch 120 receives electrical power from first source lugs 82 and delivers that power to load lugs 86. Under normal operating conditions, first source contact 92 contacts first contact 94 forming a first contact pair and first load contact 88 contacts third contact 98 forming a second contact pair. The contact pairs are locked together by resilient members 18 and by the engagement of cammed surface 102 with the locking tabs.

Accordingly, during a short or overload condition, the pairs do not separate and no arcing occurs which can damage the contacts. When the controller senses that the available power from first source lugs 82 is below a pre-set amount, the controller causes solenoid 130 to actuate causing plunger 134 to move linearly which causes flywheel 126 to rotate against switch resilient member 128 and breaks the contact pair of first source contact 92 with first contact 94 and, nearly simultaneously, breaks the contact pair of first load contact 88 with third contact 98. As flywheel 126 continues to rotate, second contact 96 contacts the second source contact forming a third contact pair and, nearly simultaneously, fourth contact 100 contacts second load contact 90 forming a fourth contact pair and restoring electrical power to load lug 86.

After the third and fourth contact pairs are formed, flywheel 126 continues to rotate further and locks the third and fourth pairs together by compressing resilient members 18 and engaging cammed surface 102 with the locking tabs. During a short or overcurrent condition when load lug 86 is electrically connected to second source lug 84, the contacts are protected from damaging electrical arcs by dual disc 10 being an interior locking device. Accordingly, dual disc 10 is a cost-efficient and effective interior locking device which reduces the amount of play in an automatic transfer switch and, therefore, reduces damaging arcs providing for a long lasting and reliable automatic transfer switch.

Figure 4:
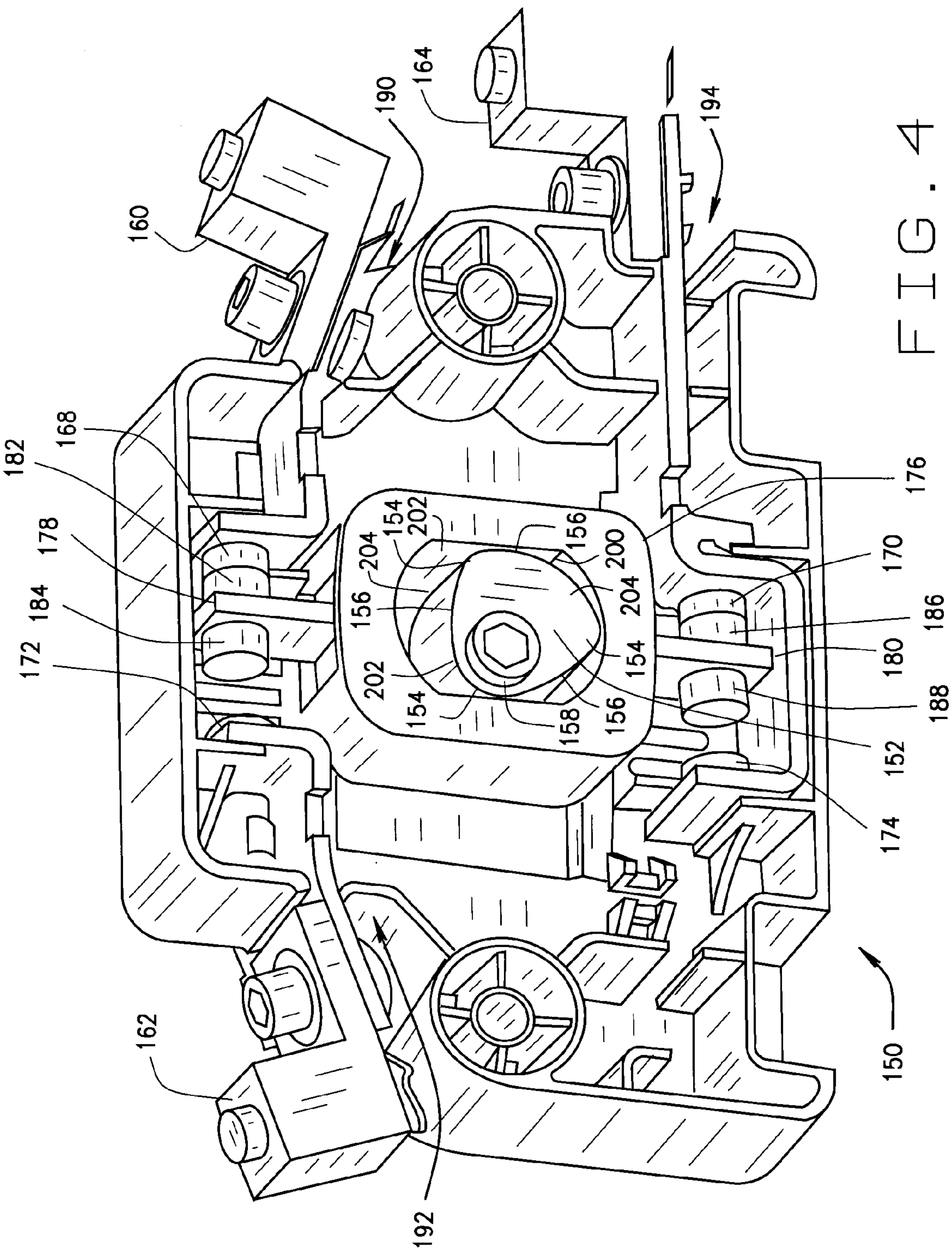
FIG. 4 is a perspective view of a pole unit including a conjugate cam.

FIG. 4 is a perspective view of a pole unit 150 including a conjugate cam 152. Conjugate cam 152 is shaped tri-lobal with three apexes 154 and three arcuate sections 156. Each arcuate section 156 extends between two apexes 154. Conjugate cam 152 further includes a shaft receiving section 158 proximate one apex 154. Shaft receiving section 158 includes a polygonal bore to receive a shaft (not shown). In an exemplary embodiment, the polygonal bore is a hexagonal bore.

Pole unit 150 includes a first source lug 160, a second source lug 162, and a load lug 164. Pole unit 150 further includes a housing 166 fabricated from a nonconductive material. Housing 166 electrically isolates first source lug 160, second source lug 162, and load lug 164 from each other. Pole unit 150 further includes a first source contact 168 electrically connected to first source lug 160, a first load contact 170 electrically connected to load lug 164, a second source contact 172 electrically connected to second source lug 162, and a second load contact 174 electrically connected to load lug 164.

A contact assembly 176 is slideably mounted within pole unit 150. A first conductor 178 and a second conductor 180 extend from assembly 176. First conductor 178 is electrically connected to second conductor 180. First conductor

178 includes a first contact 182 and a second contact 184 mounted thereon. Second conductor 180 includes a third contact 186 and a fourth contact 188 mounted thereon. Housing 166 includes a first slot 190 substantially adjacent first source lug 160, a second slot 192 substantially adjacent second source lug 162, and a third slot 194 substantially adjacent load lug 164. Contact assembly 176 further includes an inner surface 200 including two parallel sections 202 joined by two arcuate sections 204.

A plurality of pole units 150 are assembled to fabricate an automatic transfer switch (not shown) substantially similar to switch 124 (shown in FIG. 3) except pole units 80 are replaced with pole units 150. In operation, the transfer switch receives electrical power from first source lugs 160 and delivers that power to load lugs 164. Under normal operating conditions, first source contact 168 contacts first contact 182 forming a first contact pair and first load contact 170 contacts third contact 186 forming a second contact pair.

The contact pairs are locked together by a locking engagement between inner surface 200 of contact assembly 176 and apexes 1154 and arcuate sections 1156 of conjugate cam 152. Accordingly, during a short or overload condition, the pairs do not separate and no arcing occurs which can damage the contacts. When a controller senses that the available power from first source lugs 160 is below a pre-set amount, the controller causes a solenoid to actuate causing a plunger to move linearly which causes a flywheel to rotate against a switch resilient member. When the flywheel rotates, conjugate cam 152 rotates counter-clockwise and, after a sufficient rotation, conjugate cam 152 rotates against parallel portion 202 distal from load lug 164, causing assembly 176 to move away from first source lug 160 breaking the contact pair of first source contact 168 with first contact 182 and, nearly simultaneously, breaking the contact pair of first load contact 170 with third contact 186.

As the flywheel continues to rotate, conjugate cam 176 continues to rotate thus moving assembly 176 closer to second source lug 162 until second contact 184 contacts second source contact 172 forming a third contact pair and, nearly simultaneously, fourth contact 188 contacts second load contact 174 forming a fourth contact pair and restoring electrical power to load lug 164. After, the third and fourth contact pairs are formed, assembly 176 is stationary, but conjugate cam 176 continues to rotate further providing a positive lock for the third and fourth pairs. During a short or overcurrent condition when load lug 164 is electrically connected to second source lug 162, the contacts are protected from damaging electrical arcs by conjugate cam 152 being an interior locking device.

Accordingly, conjugate cam 152 is a cost-efficient and effective interior locking device which reduces the amount of play in an automatic transfer switch and, therefore, reduces damaging arcs providing for a long lasting and reliable automatic transfer switch.

While the invention has been described in terms of various specific embodiments, those skilled in the art will recognize that the invention can be practiced with modification within the spirit and scope of the claims.

What is claimed is:

1. A method for locking contacts in an automatic transfer switch including a plurality of pole units including a plurality of contact pairs, said method comprising the steps of:

mounting an interior locking device in at least one pole unit; and locking at least one contact pair individually with the interior locking device with a dual disk housed in that contact pair's pole unit.

2. A method according to claim 1 wherein said step of locking at least one contact pair further comprises the step of locking a plurality of contact pairs individually with an interior locking device housed in each pole unit.

3. A method according to claim 2 wherein said step of locking a plurality of contact pairs further comprises the step of locking a plurality of contact pairs individually with a conjugate cam housed in each pole unit.

4. A method according to claim 2 wherein said step of locking a plurality of contact pairs further comprises the step of locking a plurality of contact pairs individually with a dual disk housed in each pole unit.

5. A method according to claim 4 wherein said step of locking a plurality of contact pairs further comprises the step of locking a plurality of contact pairs individually with a dual disk housed in each pole unit, the dual disk comprising a cammed surface configured to engage a plurality of raised protrusions.

6. A method according to claim 1 wherein said step of locking at least one contact pair further comprises the step of locking at least one contact pair individually with a conjugate cam.

7. A method according to claim 1 wherein said step of locking at least one contact pair further comprises the step of locking at least one contact pair individually with a dual disk comprising a cammed surface configured to engage a plurality of raised protrusions.

* * * * *